(12) United States Patent
Watanabe et al.

(10) Patent No.: US 8,313,193 B2
(45) Date of Patent: Nov. 20, 2012

(54) POLARIZING LENS

(75) Inventors: Yoshifumi Watanabe, Shinjuku-ku (JP); Eiichi Yajima, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 103 days.

(21) Appl. No.: 12/850,323

(22) Filed: Aug. 4, 2010

(65) Prior Publication Data
US 2011/0032475 A1    Feb. 10, 2011

(30) Foreign Application Priority Data

Aug. 5, 2009 (JP) .................................. 2009-182884
Jul. 23, 2010 (JP) .................................. 2010-166257

(51) Int. Cl.
*G02B 7/12* (2006.01)
*G02B 1/08* (2006.01)

(52) U.S. Cl. .............................. 351/159.56; 359/486.01
(58) Field of Classification Search .......... 351/163–165, 351/159.6–159.65; 359/486.01–486.03
See application file for complete search history.

(56) References Cited

U.S. PATENT DOCUMENTS

| 2,359,456 | A  |    | 10/1944 | Young |
| 2,400,877 | A  |    | 5/1946  | Dreyer |
| 2,577,620 | A  |    | 12/1951 | Mahler |
| 2,603,129 | A  |    | 7/1952  | Dreyer |
| 4,865,668 | A  |    | 9/1989  | Goepfert et al. |
| 7,597,442 | B2 |    | 10/2009 | Biver et al. |
| 7,632,540 | B2 | *  | 12/2009 | Kumar et al. .................. 427/162 |
| 2005/0219696 | A1 | * | 10/2005 | Albert et al. .................. 359/489 |
| 2008/0252846 | A1 |   | 10/2008 | Biver et al. |

FOREIGN PATENT DOCUMENTS

| JP | 2002-527786 A | 8/2002 |
| JP | 2007-77327 A | 3/2007 |
| WO | 00/22463 A1 | 4/2000 |
| WO | 2006/081006 A2 | 8/2006 |

OTHER PUBLICATIONS

European Search Report dated Nov. 22, 2010.

* cited by examiner

*Primary Examiner* — Darryl J Collins
(74) *Attorney, Agent, or Firm* — Sughrue Mion, PLLC

(57) ABSTRACT

An aspect of the present invention relates to a polarizing lens comprising a polarizing layer on a substrate, wherein the polarizing layer comprises polarization axes that are at least partly in the form of a closed curve.

10 Claims, 8 Drawing Sheets

POLARIZING LENS

CROSS-REFERENCE TO RELATED APPLICATIONS

This application claims the benefit of priority under 35 USC 119 to Japanese Patent Application No. 2009-182884 filed on Aug. 5, 2009 and Japanese Patent Application No. 2010-166257 filed on Jul. 23, 2010, which are expressly incorporated herein by reference in their entirety.

BACKGROUND OF THE INVENTION

1. Field of the Invention

The present invention relates to a polarizing lens that is suitable for use as an eyeglass lens functioning to absorb or transmit light of a specific direction of polarization for the purpose of blocking light such as reflected light having a specific direction of polarization outdoors or the like.

2. Discussion of the Background

Polarizing lenses have been developed to reduce light reflecting off the surface of water, the glare from illumination, and the like so as to improve the field of view in outdoor activities and the like. Polarizing films prepared by stretching a conventional polymer film in a prescribed direction to specify directions of the polarization axes have generally been employed in such polarizing lenses as well as the polarizing elements used in liquid-crystal displays and the like. In this regard, polarizing layers formed by laminating dichroic dyes on orienting films positioned on the surface of a substrate have been developed in recent years. For example, a polarizing element having a polarizing layer and a protective layer on the surface of a transparent substrate as well as having an inorganic intermediate layer of silica ($SiO_2$) or the like as an orienting film between the polarizing layer and the transparent substrate has been proposed as a structure for such polarizing elements employing dichroic dyes. Such polarizing elements are proposed in WO2006/081006, which is expressly incorporated herein by reference in its entirety. By providing a pattern of peaks and valleys in the form of stripes, for example, on an orienting film, the polarizing element is formed so that the polarization axes run either in the direction of the stripes or perpendicular to them.

A polarizing lens for eyeglasses in which the surface of the lens is, for example, divided into middle, left, and right portions, and polarizing films of different directions of polarization axes are incorporated into the divided regions has been proposed in US2008/0252846A1 and Family member U.S. Pat. No. 7,597,442, which are expressly incorporated herein by reference in their entirety. In the eyeglass lens described in US2008/0252846A1, as shown in the plan view of FIG. 9, for example, the optical surface of lens 100 is divided into three parts by dividing lines running vertically (perpendicular) to the line of sight. Among these three divided regions, in center region 101, the polarization axes are straight lines running left and right (horizontally) with respect to the line of sight. In left and right peripheral portions 102a and 102b, that is, in the peripheral portions of the nose side and the ear side, the polarization axes are straight lines running up and down (vertically).

Regions comprised of polarization axes vertically running in different directions are provided in the polarizing lens described in US2008/0252846A1, in contrast to a conventional polarizing lens, in which the polarization axes (absorption axes) are straight lines running horizontally to suppress light reflecting off horizontal surfaces such as the surface of a body of water such as the sea or a river. This is to adapt to the general conditions of glare in an urban environment by taking into account the effects on the horizontal portions of the field of view of reflections off of window glass and the like on the vertical walls of buildings in the urban environment. It is also to adapt to vehicles present to the right and left of the wearer, and to the field of view of vehicle drivers.

However, in the polarizing lens described in US2008/0252846A1, when the polarization axis is sharply distributed perpendicular to a specified direction as shown in FIG. 9, and the orientation of the face is slightly changed, there are cases where the function of blocking reflected light may suddenly decrease. In such cases, they eyes end up being stimulated in an unpleasant manner.

In reality, the direction of polarization of light reflecting off of vertical surfaces such as window glass is not necessary a constant direction. There are many situations where the reflected light cannot be adequately suppressed even when using the polarizing lens disclosed in US2008/0252846A1. The change in the direction of polarization of such reflected light will be described with reference to FIGS. 10 to 13.

FIG. 10 is a diagram showing the direction of polarization of light reflecting off of a horizontal surface such as the surface of a body of water. FIG. 10 is a lateral view of how a ray of incident light Li reflects off horizontal surface 50 in the form of the surface of a body of water, the glossy surface of a table, or the like. The normal line to the position of incidence on horizontal surface 50 is indicated by dotted line v and the reflected light is indicated by arrow Lr. Natural light such as sunlight does not have a definite direction of polarization, but is polarized in every direction. The component of light in which the electric vector oscillates along a plane (the incidence plane) running in the direction of incidence and the direction of reflection, as indicated by arrow p, is called p component (p polarized light), and the component of light in which the electric vector oscillates perpendicular to the incidence plane, as indicated by arrow s, is called the s component (s polarized light). The reflectance of the light changes with the angle of incidence, but in most regions from an angle of incidence of 0° to 90°, the reflectance of p polarized light is lower than the reflectance of s polarized light. At a given angle of incidence (Brewster angle $\theta_B$), it is known to become zero.

Additionally, the larger the angle of incidence of s polarized light becomes, the greater the reflectance tends to be. In most regions, the reflectance of s polarized light is greater than that of p polarized light. That is, in reflected light Lr, s polarized light is dominant over most of the range of angles of incidence. Accordingly, it is possible to efficiently control light reflecting off the surface of such an object by blocking s polarized light with a polarizer. In particular, since only s polarized light is reflected in light reflecting at the Brewster angle, the reflected light can be suppressed to near zero.

As shown in FIG. 10, when human eye 60 is looking in a horizontal direction, the direction of polarization of the reflected light is transverse relative to eye 60, that is, horizontal. When the polarization axis that blocks the polarization direction (s polarized light) of such reflected light (the direction in which s polarized light is absorbed and p polarized light is passed) is made the absorption axis and a polarizing lens is worn, if the absorption axis is the horizontal direction, light reflecting of a horizontal surface can be suppressed well. When viewing a horizontal surface such as the surface of a body of water, it is sufficient to block s polarized light regardless of the angle of incidence, that is, any polarizing lens having an absorption axis that is horizontal will do, regardless of the position of the sun.

However, light reflecting off of approximately vertical surfaces, such as the exteriors of buildings, the lateral surfaces of vehicles, and window glass has a different direction of polarization. FIG. 11 is a drawing showing the direction of polarization when incident light Li enters from a horizontal direction relative to vertical surface 51. In FIG. 11, portions corresponding to FIG. 10 are denoted by identical numbers and their repeat description is omitted. Reflected light Lr from vertical surface 51 is similarly dominated by s polarized light that is vertical to the surface of incidence, but s polarized light when the light comes from a horizontal direction is in a vertical direction as viewed by human eye 60. That is, to block the light arriving in a horizontal direction that has reflected off a vertical surface relative to human eye 60, it is desirable to wear a polarizing lens with absorption axes lying in the vertical direction.

However, the direction of polarization of reflected light only becomes vertical under special conditions at dawn and dusk, and the direction of polarization of reflected light changes over time. For example, as shown in FIG. 12, the direction of polarization of light Lr reflecting off of vertical surface 51 when incident light Li arrives at a diagonal angle becomes diagonal relative to eye 60 when vertical surface 51 is viewed from below at an angle looking upward. As shown in FIG. 13, at around noon, the light enters vertical surface 51 from a direction vertically above, so the direction of polarization of reflected light Lr becomes nearly horizontal with respect to human eye 60 when looking upward from below. In FIGS. 12 and 13, portions corresponding to FIG. 11 are denoted by identical numbers and their repeat description is omitted.

That is, the direction of polarization of light reflecting off of vertical surface 51 gradually changes over time within a range running from the horizontal to the vertical direction. Additionally, there are also cases where light reflects off of curved surfaces and inclined surfaces on vehicles and the like in addition to buildings. Thus, in the urban environment, there are directions of polarization in directions inclined at various angles. Accordingly, simply making the absorption axes horizontal in the middle and vertical on the left and right sides in the manner described in US2008/0252846A1 ends up causing the effect of reflected light suppression to go unutilized during many periods of the day, resulting in a polarizing lens that cannot function satisfactorily.

Based on the same principle, even revolution of the human eyeball can conceivably change the direction of polarization of reflected light. The angle of incidence of reflected light does not depend just on the displacement of sunlight. For example, when buildings are located close together in the urban environment, multiple reflections between building and building, building and car, and the like can cause the angle of incidence to change to one that differs from the orientation of sunlight. In such cases, when the eyeballs are revolved, causing reflected light arriving from a diagonal direction to enter the eyes, the blocking function of a polarizing lens configured as shown in FIG. 9 is inadequate. That is, so long as the absorption axes of the polarizing lens is linear and the directions are limited to the horizontal and vertical, the suppressive effect on reflected light will be limited and there will be numerous conditions and periods of day when the effect will be inadequate.

In configurations in which the boundary line of the polarization axis (absorption axis) of a lens changes 90° at a boundary, directional revolution of the eyeball will sharply change how well a polarizing lens blocks light; it is undesirable for the eye. Blocking reflected light in diagonal directions when the directions of the absorption axes are divided into individual zones and are discontinuous requires, for example, changing the area of regions in which the polarization axes are vertical in peripheral portions, or assembling polarizing elements with absorption axes aligned in different directions. That is, when the surface of a lens is simply divided up into multiple sections and regions with different absorption axes are provided, multiple variations must be prepared to block polarized light that enters from the diagonal direction and varies or changes the angle of incidence of the light. This is extremely impractical because it requires the wearer to change polarizing lenses based on need. Thus, there is a need for a polarizing lens that does not require the switching out of polarizing lenses and that is capable of flexibly handling directions of polarization of reflected light that change with the angle of incidence of light and directional revolution of the eyeball.

SUMMARY OF THE INVENTION

An aspect of the present invention provides for a polarizing lens having a blocking effect on light reflected over a broader range of angles of incidence.

An aspect of the present invention relates to a polarizing lens comprising a polarizing layer on a substrate, wherein the polarizing layer comprises polarization axes that are at least partly in the form of a closed curve.

In the present invention, the term "polarization axis" refers to an absorption axis that absorbs light in a specified direction of polarization. The term "direction of polarization axis" (polarization axis direction) refers to the tangential direction with regard to a polarization axis that is in the form of a closed curve. The "closed curve" means a curve in the form of a loop that is closed. In the present invention, the term "curve" includes first-order curves, that is, lines.

As set forth above, at least a portion of the polarizing lens of the present invention comprises polarization axes that are closed curves. Thus, the in-surface distribution of the polarization axes changes smoothly; the directions of the polarization axes do not change abruptly in the manner of the polarizing lens described in US2008/0252846A1. Within the region where the polarization axes are in the form of closed curves, a region that blocks light entering from any direction over an angular range of 360 degrees will be present as the wearer of the lens rotates his eyeballs so as to change the direction of his line of sight from forward to right, left, or a diagonal direction. Thus, the wearer can achieve a desirable light-blocking effect by rotating his eyeballs, that is, by selecting a direction of a line of sight. The term "rotation of the eyeballs" in the present invention refers not just to cases of random rotation, but also to rotation with the front direction as a center axis (that is, revolution).

A desirable embodiment of the polarizing lens of the present invention comprises polarization axes that are in the form of a closed curve and inclined relative to a horizontal direction in a left and right peripheral region away from the geometric center of the lens.

In the present invention, the "geometric center of the lens" refers to the optical center of the lens when no corrected vision is added and in the case of a single-vision lens. In the case of a progressive dioptric power lens for both near and far viewing, it refers to the prism measurement reference point. However, depending on the design and the like, it may refer to a location away from the prism measurement reference point, such as the middle point of a line segment connecting the reference point for measurement of far portion and the reference point for measurement of near portion. The term "left and right peripheral region away from the geometric center" means regions positioned at the side of the ear or the side of the noise based on a center region containing the geometric center when the lens is being worn. Unless specifically stated otherwise, positions and directions on the lens in the present invention refer to positions and directions when the lens is being worn.

By using a configuration in which the directions of the polarization axes are inclined relative to a horizontal direction in a right and left peripheral region of the lens, when the eyeballs of the wearer are rotated to change the direction of the line of sight of the wearer from the front to either the right or left, or a diagonal direction, it becomes possible to block polarized light entering in a diagonal direction from a building, car window, or the like. In particular, the directions of the polarization axes change continuously in diagonal directions in the portions in which the polarization axes are in the form of closed curves, achieving a state similar to that of positioning a polarizing film that has a blocking effect over a wide angular range on light entering from diagonal directions. Thus, it becomes possible to handle not just changes over time in light reflecting off the surfaces of structures such as buildings, but also reflected light containing complex axial directions that is reflected off of the curved glass surfaces of automobiles, for example. Further, abrupt changes in blocking effects can be avoided that are caused by changes in the direction of the line of sight of a lens wearer due to rotational movement of the eyeballs under such conditions.

For example, the conventional polarizing lens shown in FIG. 9, which has only linear polarization axes provided horizontally in the center and vertically on the two sides, can only block light from specific directions in the light reflecting off vertical surfaces such as buildings and curved surfaces such as cars. In contrast, the present invention can have a blocking effect on incident light entering at various angles in diagonal directions, as set forth above. Further, the use of a closed-curve shape makes it possible to incorporate a region in which the polarization axes are horizontal in the center region of the lens for forward viewing. Thus, light reflecting off of horizontal surfaces and light from above reflecting off of vertical surfaces can be blocked in the center portion, and reflected light entering from diagonal directions and reflected light entering from horizontal directions can be blocked by the peripheral portions, each efficiently blocking unneeded light. In this case, the wearer can rotate his eyeballs as needed to suitably select a proper line of sight.

A desirable embodiment of the polarizing lens of the present invention is configured to include a region in which the directions of the polarization axes in the form of a closed curve are formed based on the angle of eyeball rotation. That is, in the polarizing lens of the present invention, the polarization axes in the form of a closed curve are desirably disposed in a portion that is made the field of view by changing the direction of the line of sight from the front direction to a horizontal or diagonal direction by rotating the eyeballs, for example. Thus, the wearer can realize a blocking effect even when the direction of the line of sight of the wearer is changed by rotating the eyeballs.

In the present invention, the term "angle of eyeball rotation" refers to the angle of deviation θ from a prescribed direction when the position on the lens in the direction of the line of sight at that angle is denoted by the polar coordinates (r, θ), with the geometric center of the lens serving as the pole O (origin). That is, making the directions of the polarization axes closed curves based on the angle of rotation of the eyeball means that the directions of the polarization axes are disposed with a specific relation corresponding to the angle of eyeball rotation. For example, a configuration is employed in which the direction of the polarization axes (absorption axes) is about 45 degrees from the horizontal direction when the angle of eyeball rotation is in a region with an angle of deviation of 45 degrees from the vertical direction, and the direction of the polarization axes is about 90 degrees from the horizontal direction when in a region with an angle of deviation of 90 degrees above from the vertical direction. In the present invention, the term "vertical direction on the lens" refers to the direction along the meridian when the vertical direction from the geometric center of the lens (and the direction of extension upward there from) is projected onto the surface of the lens.

Determining the direction of the closed-curve polarization axes based on the angle of eyeball rotation in this manner makes it possible to distribute the polarization axes so that they run along with the movement of the eyeball. Accordingly, light can be blocked in a more flexible manner when there are external changes produced by rotational movement of the eyeball, that is, changes in the direction of polarization of light entering the eyeball; the light-blocking effect can be varied based on the natural movement of the eyeball; and changes can be smoothly implemented.

A further desirable embodiment of the polarizing lens of the present invention is continuous change in the directions of the polarization axes. When the x-axis lies in a horizontal direction (standard line direction) running through the geometric center of the lens and the y-axis runs in a direction perpendicular thereto through the geometric center, for example, the term "continuous" as used here ideally means the state in which the second derivatives become constant and there is no divergence in the distribution of the polarization axes when the directions of the polarization axes in the polarizing layer are projected onto the plane of the x-y coordinate axes. The degree of continuity need only be of a scale that is recognizable by human vision; continuity at the microscope scale of the molecule or the like is not required. Further, when, for example, the directions of the polarization axes are comprised of a linear region and a closed-curved region, the connecting portion desirably changes smoothly.

A further desirable embodiment of the polarizing lens of the present invention is one in which the distribution of the polarization axes contains a region in which the directions of the polarization axes are horizontal within a region extending from the center region of the lens to the vertical direction. That is, within a region extending from a center region containing a geometric center to a vertical direction, a region in which directions of the polarization axes are horizontal is desirably positioned.

When employing such a configuration, the direction of polarization of light reflecting off of horizontal surfaces and vertical surfaces that is seen when the eyeballs are rotated to change the direction of the line of sight from the front direction to a vertical direction is horizontal, so the lens can function to block reflected light of this orientation.

In a still further desirable embodiment of the polarizing lens of the present invention, the polarization axes are distributed in concentric circles. That is, multiple polarization axes in the form of a closed curve are desirably disposed in concentric circles centered on a geometric center of the polarizing lens. Disposition in concentric circles can ensure that in at least the front direction and the regions above and below it, the directions of the polarization axes approach the horizontal direction, or in right and left peripheral directions, the directions of the polarization axes change continuously from diagonal to approaching the vertical direction, and the polarization axes can be distributed in a naturally corresponding manner that is not excessive relative to changes in the direction of the line of sight due to rotation of the eyeball (changes in the angle of rotation of the eyeball). Further, when it is desirable to increase the region in which light reflecting off of horizontal surfaces is blocked, it is also possible to form a region that contains elliptical closed-curve polarization axes, the long axes of which extend horizontally, for example.

In a still further desirable embodiment of the polarizing lens of the present invention, the region in the vicinity of the geometric center of the lens is made a non-polarizing region. This region does not have to be circular in shape. When it is circular, the diameter thereof, and when it is not circular, its length in a horizontal direction and in a vertical direction passing through the geometric center is desirably equal to or greater than 4 mm but equal to or less than 15 mm.

Making the vicinity of the geometric center a non-polarizing region can make it possible to avoid sudden changes in the light-blocking effect when the eyeballs are oriented close to straight forward without producing abrupt changes in the directions of the polarization axes in the center of the field of view.

A region that is less than 4 mm in size is excessively small. At greater than 15 mm, the region with no light-blocking effect tends to broaden excessively. Thus, the size of this region is desirably equal to or greater than 4 mm but equal to or less than 15 mm.

A further desirable embodiment of the polarizing lens of the present invention is a configuration in which the polarizing layer contains a dye (dye layer), and an orientation layer is present between the dye layer and the substrate. Providing such an orientation layer and a dye layer, making the dye layer a polarizing layer, and forming a pattern of peaks and valleys on the surface of the orientation layer can permit ready control of the directions of the polarization axes of the dye layer above it. Thus, it is readily possible to form various closed-curve polarization axes including concentric circles, described above.

A further embodiment of the polarizing lens of the present invention is a polarizing lens containing an additional polarizing layer comprising polarization axes directions of which are different from those of the polarization axes of the above polarizing layer.

Providing the two polarizing layers described above can permit the realization of a gradual or partial change in contrasting density (gradation) within the lens surface.

The polarizing lens of the present invention can achieve a desired light blocking effect by selecting the spot being viewed within the lens based on the surrounding environment.

Other exemplary embodiments and advantages of the present invention may be ascertained by reviewing the present disclosure and the accompanying drawing.

BRIEF DESCRIPTION OF THE DRAWINGS

The present invention will be described in the following text by the exemplary, non-limiting embodiments shown in the figure, wherein:

In FIG. 6A, the direction of polarization of the light is nearly vertical. In FIG. 6B, it is about 45 degrees away from the vertical direction. And FIG. 6C shows the case where it is roughly the horizontal direction.

DETAILED DESCRIPTION OF THE EMBODIMENTS

Figure 1:
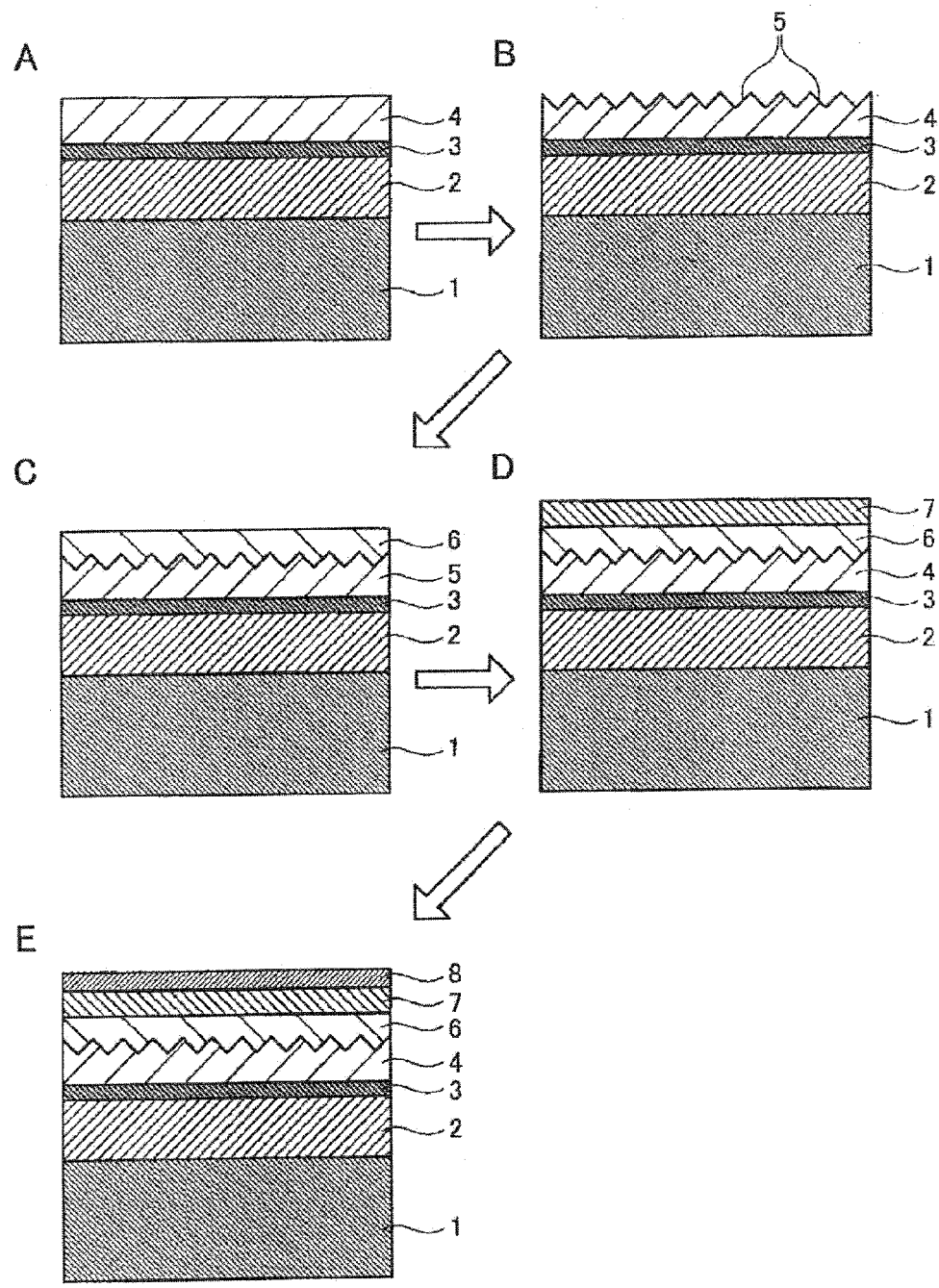
FIGS. 1A to 1E are diagrams of steps in a method of manufacturing a polarizing lens relating to a mode of carrying out the present invention.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Modes of carrying out the invention will be described in detail below. The description will be given in the following sequence.

1. First implementation mode
   (1) Substrate
   (2) Orientation layer
   (3) Polarizing layer
   (4) Manufacturing method
   (5) Basic structure of polarizing lens
   (6) Distribution of directions of polarization axes
   (7) Changes in the light-blocking region based on differences in directions of polarization
2. Second implementation mode
3. Third implementation mode The polarizing lens of the present invention can be applied to eyeglasses and sunglasses, as well as to any lenses performing the function of allowing a wearer to view the outside world through polarizing lenses. For example, it can be applied to optical applications such as automobile windshields and window glass in buildings. Of these, the polarizing lens of the present invention is preferably employed as a plastic eyeglass lens. The refractive index of the lens is not specifically limited, and is normally about 1.5 to 1.8.

(1) Substrate

The substrate in the polarizing lens of the present invention is not specifically limited; examples are plastic and inorganic glass. Examples of plastics are methyl methacrylate homopolymer, copolymers of methyl methacrylate and one or more other monomers, diethylene glycol bisallyl carbonate homopolymer, copolymers of diethylene glycol bisallyl carbonate and one or more other monomers, iodine-containing copolymers, halogen copolymers, polycarbonates, polystyrenes, polyvinyl chloride, unsaturated polyester, polyethylene terephthalate, polyurethanes, polythiourethanes, polymers made from materials including epithio group-containing compounds, homopolymers of monomers having sulfide bonds, copolymers of a sulfide and one or more other monomers, copolymers of a polysulfide and one or more other monomers, and copolymers of a polysulfide and one or more other monomers.

When the polarizing lens also does double duty as a corrective lens, either the front surface, which is considered to be the object side, or the image side, which is the rear side and considered to be the eyeball side, or both sides, can be molded, surface polished, or the like to form curved surfaces imparting a prescribed number of diopters of correction.

(2) Orientation Layer

An orientation layer can be provided between the substrate and the polarizing layer to specify the directions of the polarization axes. When formed of inorganic materials, examples of the inorganic materials are metal oxides, and complexes thereof, selected from among Si, Al, Zr, Ti, Ge, Sn, In, Zn, Sb, Ta, Nb, V, and Y. Of these, SiO and $SiO_2$ are suitable because they are relatively inexpensive and easy to handle. The thickness of the orientation layer need only fall within a range permitting the uniform formation of polarization axes in the polarizing layer provided over it, and can be, for example, equal to or higher than about 85 nm and equal to or lower than about 500 nm.

A material containing organic compounds can also be employed as the material used to form the orientation layer so long as it affords a certain degree of adhesion to the substrate and permits the ready specification of the directions of the polarization axes in the upper polarizing layer. Examples of such materials are sol-gel films containing (A) inorganic oxide sols, and (B) at least either the alkoxysilane denoted by general formula (1) below and/or the hexaalkoxydisiloxane denoted by general formula (2) below. As needed, a sol-gel film employing a material containing (C) the functional group-containing alkoxysilane-containing compound denoted by general formula (3) below can be employed as the above material.

$Si(OR^1)_a(R^2)_{4-a}$ (1)

$(R^3O)_3Si\text{—}O\text{—}Si(OR^4)_3$ (2)

$R^5\text{—}Si(OR^6)_b(R^7)_{3-b}$ (3)

In the above formulas, each of $R^1$ in general formula (1) above and $R^3$ and $R^4$ in general formula (2) above independently denotes a linear, branched, or cyclic alkyl group having 1 to 5 carbon atoms, such as a methyl group, ethyl group, n-propyl group, isopropyl group, n-butyl group, isobutyl group, sec-butyl group, tert-butyl group, pentyl group, or cyclopentyl group. Of these, a methyl group or ethyl group is desirable.

In general formula (1), $R^2$ denotes an alkyl group with 1 to 10 carbon atoms. Examples are the above alkyl group having 1 to 5 carbon atoms, a hexyl group, a heptyl group, an octyl group, and a 2-ethylhexyl group. Of these, a methyl group, ethyl group, propyl group, or butyl group is desirable. In general formula (1), a denotes 3 or 4.

Examples of tetraalkoxysilanes (where a=4 in the formula) denoted by general formula (1) are: tetraethoxysilane (TEOS), tetramethoxysilane, tetraisopropoxysilane, tetra-n-propoxysilane, tetra-n-butoxysilane, tetra-sec-butoxysilane, and tetra-tert-butoxysilane.

Examples of trialkoxysilanes (where a=3) denoted by general formula (1) are methyltrimethoxysilane, methyltriethoxysilane, methyltriisopropoxysilane, methyltri-n-propoxysilane, methyltri-n-butoxysilane, methyltri-sec-butoxysilane, and methyltri-tert-butoxysilane.

The hexaalkoxydisiloxane denoted by general formula (2) is not specifically limited. Examples are hexamethoxydisiloxane and hexaethoxydisiloxane.

In general formula (3), $R^5$ denotes an organic group having one or more functional groups selected from the group consisting of glycidoxy groups, epoxy group, amino groups, and isocyanate groups; each of $R^6$ and $R^7$ independently denotes an alkyl group having 1 to 5 carbon atoms and b denotes 2 or 3.

Normally, a pattern of peaks and valleys of prescribed shape is formed in the orientation layer. The details thereof will be set forth further below. The orientation layer can be directly laminated onto the substrate, or some other layer may be inserted between the substrate and the orientation layer. Examples of other layers are hard coat layers and primer layers.

The material of a hard coat layer is not specifically limited. Coating compositions comprised of known organic silicon compounds and inorganic oxide colloid particles can be employed. The organic silicon compounds and inorganic oxide colloid particles described in paragraphs [0071] to [0074] of Japanese Unexamined Patent Publication (KOKAI) No. 2007-77327, for example, can be employed. The content of the above publication is expressly incorporated herein by reference in its entirety. The coating composition for hard coat layer can be prepared by a conventionally known method.

As an example of the method of forming the hard coat layer on the substrate, the coating composition is coated on the substrate, and as needed, subjected to a curing process based on the curable component contained in the coating composition. Commonly employed methods such as dipping, spin coating, and spraying can be applied as the coating means. From the perspective of surface precision, dipping and spin coating are preferred.

From the perspective of enhancing adhesion of the primer layer, various known resins such as polyurethanes can be employed. The primer layer can be formed by the method as described above for the hard coat layer.

(3) Polarizing Layer

The polarizing layer of the polarizing lens of the present invention is desirably a dye-containing layer. The dye is suitably a dichroic dye. In the present invention, the term "dichroic" means properties in which the color of transmitted light is different depending on the direction of propagation due to the presence of anisotropy in the medium in the selective absorption of light. Dichroic dyes have the properties of intensified polarized light absorption in a specific direction of dye molecules, and diminished light absorption in a direction perpendicular to the above direction. Among dichroic dyes, when water is employed as solvent, some are known to exhibit liquid crystal states at certain concentration and temperature ranges. Such liquid crystal states are referred to as lyotropic liquid crystals.

By utilizing the liquid crystal states of these dichroic dyes to cause the dye molecules to array themselves in a single specified direction, it is possible to achieve more intense dichroism.

Dichroic dyes that are known to be commonly employed, not just in eyeglass lens applications, but also in common polarizing elements can be used in the present invention. Examples are azo, anthraquinone, merocyanine, styryl, azomethine, quinone, quinophthalone, perylene, indigo, tetrazine, stilbene, and benzidine dies. The dyes described in U.S. Pat. No. 2,400,877 and Published Japanese Translation (TOKUHYO) No. 2002-527786 of a PCT International Application, which are expressly incorporated herein by reference in their entirety, are further examples.

(4) Manufacturing Method

An example of the method of manufacturing the polarizing lens of the present invention will be described with reference to the step diagrams of FIGS. 1A to E.

First, as shown in FIG. 1A, on substrate 1, as needed, hard coat layer 2 is formed for increasing resistance to scratching, for example, and primer layer 3 is formed to enhance adhesion and impact-resistance by the methods set forth above (for example, by coating by spin coating or the like and curing). Orientation layer 4 is then formed over primer layer 3.

When orientation layer 4 is being formed of inorganic materials such as SiO and $SiO_2$, it is desirably formed by vapor deposition or the like. When being formed of a material containing an organic compound, as set forth above, for example, an inorganic oxide sol, a compound containing at least one compound denoted by general formula (1) or (2), and, as needed, the material denoted by general formula (3) can be employed to fabricate a sol-gel film by spin coating or the like. In that case, the use of elaborate vacuum deposition equipment is not required, so the complexity can be eliminated and the manufacturing steps can be simplified. In that case, neither the solvent that is employed to prepare the coating liquid, the catalyst that is employed to promote the hydrolysis reaction of the silane compound, nor the quantities added or the like are specifically limited. It suffices to use a coating method such as spin coating on a material and with composition ratio that permit the formation of a film of uniform thickness and quality. Nor is the method of preparing the coating liquid specifically limited.

When above-described hard coat layer 2 and primer layer 3 are not provided, before applying the coating solution of orientation layer 4, the surface of substrate 1 can be chemically treated with an acid, alkali, or various organic solvents, physically treated by irradiation with plasma, irradiation with UV, or the like, subjected to a washing treatment with various cleaning agents, or subjected to sand blasting to enhance adhesion between the substrate and the orientation layer.

The above coating liquid can be applied by spin coating to substrate 1 and then thermoprocessed to fabricate a sol-gel film. The thickness of the sol-gel film is desirably 0.02 to 5 micrometers, preferably 0.05 to 0.5 micrometer. When the thickness is equal to or higher than 0.02 micrometer, the film does not peel off as a whole during polishing and good functioning can be imparted as orientation film 4. When equal to or less than 5 micrometers in thickness, the generation of cracks can be reduced.

Next, as shown in FIG. 1B, peak and valley pattern 5 of prescribed shape is formed in orientation layer 4. Peak and valley pattern 5 can be readily formed as rubbing traces by rubbing the surface with a material that is of suitable hardness with respect to orientation layer 4 and has a suitably coarse surface. Achieving a certain degree of uniformity in the width and depth of peak and valley pattern 5 can prevent nonuniformity in the polarizing function.

Thus, it is desirable, for example, to prepare a slurry of a polishing material with a particle diameter falling within a prescribed range and use the slurry to form peak and valley pattern 5 by rubbing. In addition to employing a slurry, rubbing with a material comprised of a polishing sheet, on which are secured abrasive grains, that has been adhered to the surface of an elastic member, can also be conducted. When the rubbing material is smaller than the lens, it is possible to form rubbing traces in the form of a closed curve over the entire lens surface by displacing the rubbing material relative to the lens along a straight line passing through the geometric center of the lens, for example, and making multiple rubs.

For most liquid crystals, friction-processing or polishing in one direction on the substrate is known to cause the liquid crystals that are coated on the substrate to align in a certain directional relation relative to the direction of the processing traces. For example, in the manufacturing of liquid-crystal displays (LCDs), to get the liquid crystals to align within the cells, it is well-known that an orientation film (polyimide film or the like) adhered to the substrate surface is rubbed in a single direction by so-called rubbing processing. The technique of coating dichroic dye-containing solution on a substrate that has been polished in one direction and exploiting the dichroism of the dye to cause it to align is disclosed in U.S. Pat. Nos. 2,400,877 and 4,865,668, which are expressly incorporated herein by reference in their entirety.

In the present invention, as in the case of the liquid crystals used to manufacture a liquid-crystal display (LCD), by using an abrasive to rub orientation layer 4 comprised of an $SiO_2$ film or sol-gel film formed on a substrate, the polarization axes can be distributed in desired directions so that the dichroic dye is arrayed in specific directions.

The abrasive that is employed in the rubbing treatment is not specifically limited. For example, a slurry containing abrasive particles that has been immersed in a foam material such as urethane foam can be employed. Examples of abrasive particles are $Al_2O_3$, $ZrO_2$, $TiO_2$, and $CeO_2$. Of these, from the perspectives of hardness relative to the orientation layer formed (ease of polishing and finishing) and chemical stability, $Al_2O_3$ and $ZrO_2$ are desirable. They may be employed singly or in combinations of two or more. The slurry containing abrasive particles may incorporate viscosity-modifying agents, pH-adjusting agents, and the like.

The average particle diameter of the abrasive particles is desirably less than 7 micrometers, preferably 0.05 to 6.7 micrometers, and more preferably, 1.5 to 3.0 micrometers to suppress nonuniformity in the function of blocking incident polarized light.

As set forth above, an orientation layer formed of a material such as a sol-gel film containing an organic substance will be of lower hardness than an orientation layer formed of an inorganic substance such as $SiO_2$. For example, even a rubbing treatment performed with fine abrasive particles with an average particle diameter of less than about 1.5 micrometers can form adequate rubbing traces. Using an abrasive of fine particles of less than about 1 micrometer permits a finer rubbing treatment. Further, the generation of haze due to rubbing traces can be prevented by employing high pressure during rubbing or concentrating the rubbing in a single spot, thereby reducing the generation of defective products, raising the productivity of polarizing lenses, and cutting costs. The conditions of the rubbing treatment are not specifically limited. The speed and pressure during rubbing and the rubbing duration (number of times) when revolving the rubbing material in an arc-shape or the like can be suitably adjusted based on the material of the orientation layer.

Figure 2:
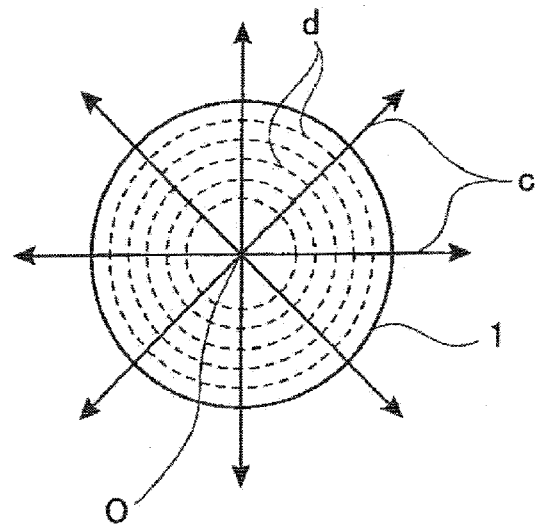
FIG. 2 is a descriptive drawing of an example of a method of forming the pattern of peaks and valleys formed by the step in FIG. 1B.

The rubbing traces that determine the shape of peak and valley pattern 5 will differ depending on whether the material on which the polarization axes of the polarizing layer are formed is lined up with peak and valley pattern 5, or whether they are formed with the material aligned perpendicular to the direction of orientation. In the former case, rubbing is conducted in a manner aligned with the distribution of the targeted direction of the polarization axes to form peak and valley pattern 5. For example, when forming a distribution of polarization axes in the form of concentric circles, rubbing is conducted so as to form concentric circles about a prescribed position. In the latter case, rubbing is conducted in a pattern perpendicular to the distribution of the targeted direction of the polarization axes. For example, when forming a distribution of polarization axes in the form of concentric circles, as shown in the example of the rubbing direction of FIG. 2, it suffices to adopt the geometric center of substrate 1 as the origin O and conduct rubbing in a radial direction from origin O in the direction of arrows c. In this case, the distribution of the polarization axes of the polarizing layer formed thereover will be the distribution in the form of concentric circles centered on origin O that is indicated by dotted lines d.

By simply forming orientation layer 4 on substrate 1 and rubbing the surface thereof in this manner, it is possible to form the polarizing layer that is formed thereover, described further below, with a desired distribution of directions of polarization axes. Accordingly, distributions with various directions of polarization axes, such as concentric circles and ellipses, as well as closed-curve shapes containing straight line portions, can be readily achieved based on the objective.

Next, as shown in FIG. 1C, a dichroic dye is deposited in oriented fashion so as to bury peak and valley pattern 5 on the surface of orientation layer 4 and form a polarizing layer 6 on orientation layer 4.

Normally, before forming polarizing layer 6, the surface of orientation layer 4 that has been treated by rubbing is thoroughly cleaned and dried. Next, a solution or suspension (desirably an aqueous solution) containing a dichroic dye is coated on orientation layer 4 that has rubbing traces, and a treatment to render the dichroic dye insoluble in water is conducted to form polarizing layer 6.

To the extent that the effect of the present invention is not lost, dyes other than the above-described dyes can be blended into the aqueous solution or suspension containing the dichroic dye to produce a polarizing lens of desired hue. From the perspective of further enhancing coatability and the like, additives such as rheology modifying agents, adhesion-promoting agents, plasticizers, and leveling agents can be blended in as needed.

The method of coating is not specifically limited. Examples are known methods such as spin coating, dip coating, flow coating, and spray coating.

The method of immersing the dichroic dye that has been coated on orientation layer 4 in a metal salt aqueous solution is desirable as a treatment to render the dye insoluble in water. The metal salt employed is not specifically limited; examples are $AlCl_3$, $BaCl_2$, $CdCl_2$, $ZnCl_2$, $FeCl_2$, and $SnCl_3$. Of these, due to ease of handling, $AlCl_3$ and $ZnCl_2$ are desirable. Following the treatment to render the dye insoluble in water, the dichroic dye-containing layer surface can be dried again.

The thickness of polarizing layer 6 is not specifically limited. To stably utilize the targeted polarizing function, a thickness of equal to or higher than 0.05 micrometer is desirable. Since no additional effect is achieved by an excessive thickness, the thickness desirably falls within a range of equal to or less than 0.5 micrometer.

As shown in FIG. 1D, it is desirable to form protective layer 7 to secure the dye on polarizing layer 6. An organic silicon compound can be employed as the material in protective layer 7. Protective layer 7 can be formed by applying a solution containing an organic silicon compound on polarizing layer 6 by a known means such as dipping, spin coating, or spraying, and then curing it with heat to form a film. In this process, the organic silicon compound may impregnate polarizing layer 6 to form a layer that substantially integrates protective layer 7 and polarizing layer 6 into one. The thickness of the integrated protective and polarized layers is not specifically limited, but desirably falls within a range of 0.05 to 1 micrometer.

Further, as shown in FIG. 1E, functional film 8 such as a scratch resistance-enhancing hard coat film, antireflective film, water repellent film, UV-absorbing film, infrared-absorbing film, photochromic film, or antistatic film can be formed by a known method over protective layer 7.

The above method can permit the fabrication of a high-quality polarizing lens by simple steps.

(5) Basic Structure of the Polarizing Lens

FIG. 3A shows a plan view of the directions of the polarization axes of a polarizing lens relating to a first implementation mode of the present invention, and FIG. 3B shows a sectional view of the same along section line I-I.

Figure 3:
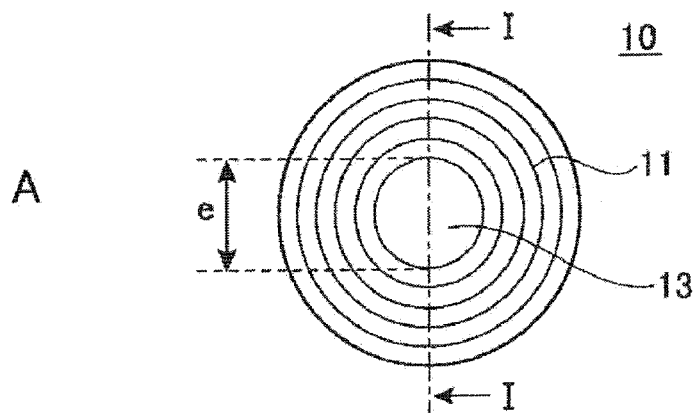
FIG. 3A is a plan view of the directions of the polarization axes of a polarizing lens relating to a first implementation mode of the present invention.
FIG. 3B is a sectional structure view of the same along section line I-I.
Figure 3:
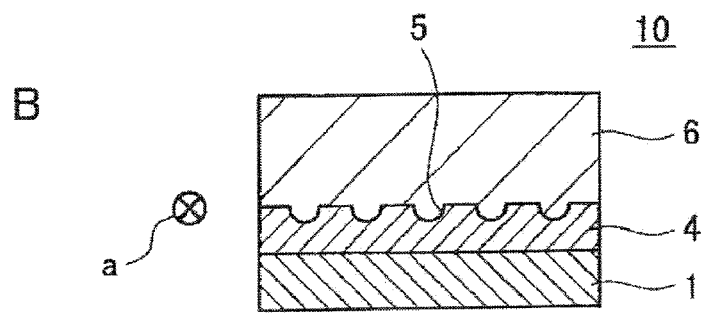

In the polarizing lens 10 of the first implementation mode, as shown in FIG. 3A, the polarization axes 11 are formed as concentric circles with the geometric center of polarizing lens 10 as the center. The directions of the polarization axes shown in FIG. 3 change continuously along the circular arcs of circles, thereby continuously changing the orientation of the polarized light that is blocked. That is, the distribution of the polarization axes is point symmetric, with the geometric center as the origin, and the directions of the polarization axes when the eyeball moves radially from the geometric center are roughly constant. Further, since the directions of the polarization axes change gradually along the circular arcs of the concentric circles, the configuration is such that even when the eyeball moves between any two positions on the lens, the light-blocking function gradually changes based on the angle of rotation of the moving eyeball.

In polarizing lens 10, the region around the geometric center is desirably non-polarizing region 13 without polarization axes. When a distribution of concentric circular polarization axes is formed even in the vicinity of the geometric center, the polarization axes change abruptly in the vicinity of the geometric center, that is, in the front sight direction of the eyeball, causing the light-blocking function to end up changing abruptly. Thus, reflected light arriving from the front direction cannot be blocked over this range, precluding a good field of view. Accordingly, the vicinity of the geometric center is desirably non-polarizing region 13 in this manner. The size of this region need only be such that a good field of view is achieved when the eyeball is facing forward; for example, a circle with a diameter e of equal to or greater than 4 mm but equal to or less than 15 mm is desirable.

As shown in FIG. 3B, polarizing lens 10 is comprised of, for example, orientation layer 4 and polarizing layer 6 containing a material having a polarizing function, such as a dichroic dye, that are sequentially formed on substrate 1 of a light-transmitting material that is molded for use as a lens. As set forth above, a hard coat layer and a primer layer can be provided as needed between orientation layer 4 and substrate 1. Further, as set forth above, a protective layer is desirably provided, and functional films can be further provided as needed, over polarizing layer 6. In this case, as set forth above, by forming peak and valley pattern 5 on the surface of orientation layer 4 and depositing polarizing layer 6 thereover, it is possible to readily form a desired distribution of the directions of the polarization axes in polarizing layer 6. Polarizing layer 6 that is formed on orientation layer 4 has polarization axes (absorption axes) in the direction of extension of peak and valley pattern 5 (the direction vertical to the surface of the paper of FIG. 3, indicated by arrow a in FIG. 3B) or in the direction perpendicular thereto. In the example of FIG. 3B, peak and valley pattern 5 is of a semicircular cross-sectional shape and is arranged in parallel at regular intervals. This is not a limitation. For example, as shown in FIG. 1B, the sectional shape of the peaks and valleys can be saw-toothed or the like, or can be irregular to a certain degree. It suffices to inhibit variation in the width, depth, and density of peak and valley pattern 5 so that a polarizing function free of at least nonuniformity that can be seen by the eye is imparted to polarizing layer 6 formed thereover. The polarizing layer normally contains two or more multiple polarization axes, but the number and spacing thereof is not specifically limited and can be set based on the desired polarization function. The multiple polarization axes within a single surface are normally arranged in parallel, but it suffices to align the directions so that they do not intersect, and they need not be completely parallel.

As set forth above, pattern 5 on orientation layer 4 can be readily formed by rubbing the surface with a material of prescribed elasticity and having an uneven surface, such as a brush or sponge. Accordingly, it is possible to readily manufacture a polarizing layer of desired curved shape without inviting an increase in the number of steps.

(6) Distribution of the Directions of the Polarization Axes

Figure 4:
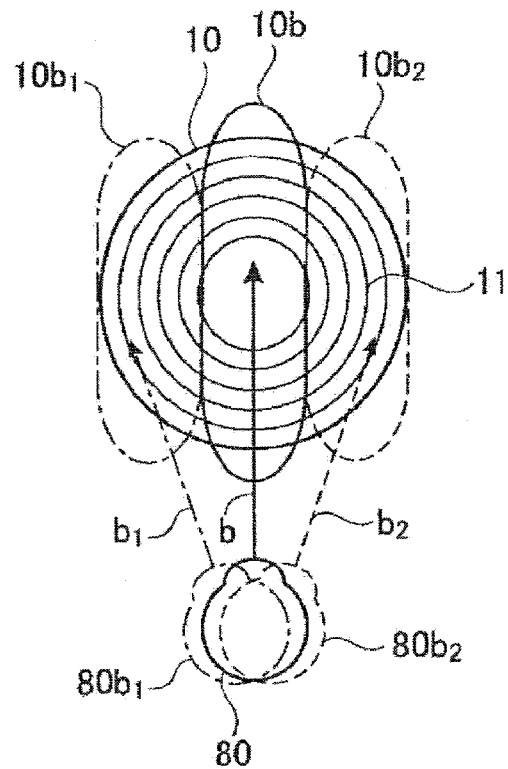
FIG. 4 is a descriptive drawing of the region of the directions of the polarization axes corresponding to revolution movement of the eyeballs in the polarizing lens shown in FIG. 3.

FIG. 4 shows a plan view of the directions of the polarization axes and the directions in which the eyeball revolves in the various regions of polarizing lens 10 of FIG. 3. In FIG. 4, the state where eyeball 80 has turned so that it is inclined to the left is indicated by dot-dash line 80b1, and the state where it is inclined to the right is indicated by dotted line 80b2. The state where the direction of the line of sight corresponding to the direction of revolution of eyeball 80 is the front direction is indicated by solid line b, that where it is left is indicated by dot-dash line b1, and that where it is right by dotted line b2. In front region 10b which includes the region where the angle of revolution of eyeball 80 of the wearer is in the front direction region as well as the upward and downward revolution regions, the polarization axes are nearly horizontal. Thus, as described using FIGS. 10 to 13, light reflecting off of horizontal surfaces such as water and light entering from above that has reflected off of vertical surfaces such as buildings can be efficiently blocked. In contrast, in the left side region 10b1 of lens 10, which becomes the region of the field of view when the direction of revolution of eyeball 80 is inclined to the left, the directions of the polarization axes are oriented downward to the left from the horizontal direction, and the angle of inclination gradually and continuously changes from the vertical direction to the lower right. Similarly, in the right side region 10b2, which becomes the region of the field of view when the direction of revolution of eyeball 80 is inclined to the right, the directions of the polarization axes are oriented downward to the right from the horizontal direction, and the angle of inclination gradually and continuously changes from vertical direction to the lower left. That is, in this case, the front region 10b has the functions of blocking light reflecting off of horizontal surfaces and blocking light reflecting off of vertical surfaces that arrives from above or below. Left side region 10b1 and right side region 10b2 have the functions of blocking reflected light arriving in diagonal directions relative to vertical surfaces and reflected light arriving in horizontal directions.

Figure 5:
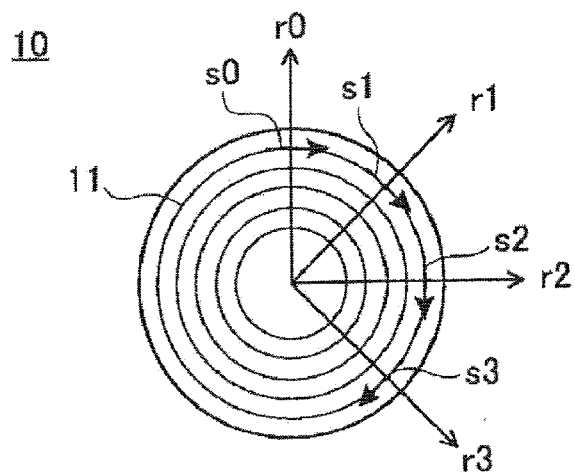
FIG. 5 is a plan view of the distribution of the directions of the polarization axes in the polarizing lens of FIG. 3.

FIG. 5 shows the distribution of the directions of the polarization axes for angles of eyeball revolution in the polarizing lens of FIG. 3. When the angle of eyeball revolution is vertical as denoted by arrow r0 (angle of deviation $\theta=0°$), the directions of the polarization axes are nearly horizontal, as indicated by arrow s0. When the angle of eyeball revolution is about 45 degrees (angle of deviation $\theta=45°$) from the vertical orientation of the upper side, as indicated by arrow r1, the directions of the polarization axes become a right downward orientation of about 45°, as denoted by arrow s1. When the angle of eyeball revolution is 90 degrees (angle of deviation $\theta=90°$) from the vertical direction, that is, is oriented in the horizontal direction, as indicated by arrow r2, the directions of the polarization axes become nearly vertical, as denoted by arrow s2. When the angle of eyeball revolution is about 135 degrees (angle of deviation $\theta=135°$) from the vertical direction of the upper side, as indicated by arrow r3, the directions of the polarization axes become about 45 degrees downward and to the left, as denoted by arrow s3. As the angle of eyeball revolution subsequently increases, the directions of the polarization axes exhibit similar change. When the directions of the polarization axes are in the form of concentric circles in this manner, the directions of the polarization axes change continuously in response to the angle of eyeball revolution, thereby achieving a configuration in which the light-blocking function changes smoothly with movement of the eyeball.

(7) Changes in the Light-Blocking Region Based on Differences in Directions of Polarization In the polarizing lens shown in FIG. 3, changes in the light-blocking region when light with different directions of polarization actually enters will be described next. FIGS. 6A to C are type drawings showing the light-blocking regions appearing in polarizing lens 10 when light (polarized light) passing through polarizing film 70 enters polarizing lens 10. The direction of polarization of the light entering polarizing lens 10 is altered by changing the orientation of polarizing film 70.

FIG. 6A is a plan view of the state when polarizing film 70 is positioned close to polarizing lens 10 having concentric circular polarization axes 11. Multiple linear transmission axes are arrayed in parallel in polarizing film 70. Arrow P denotes the direction of the transmission axes of polarizing film 70. In FIG. 6A, since the direction of polarization of polarized light passing through polarizing film 70 is parallel to the transmission axes, it is made the longitudinal direction, that is, the vertical (meridian) direction when wearing lens 10. At that time, polarization axes 11 become nearly parallel to the vertical direction in the left and right regions along the horizontal direction of lens 10, and light-blocking region 12 appears that extends to the right and left from the geometric center.

Next, as shown in FIG. 6B, polarizing film 70 is disposed at an incline of about 45 degrees from the vertical direction. The direction of polarization of the light passing through film 70 also becomes about 45 degrees from the vertical direction. In this case, as shown in FIG. 6B, a light-blocking region appears that runs from the diagonal upper left to the diagonal lower right relative to the geometric center of lens 10. The directions of the polarization axes of lens 10, that is, the directions of the absorption axes in region 12, are nearly parallel to the directions of the transmission axis of polarizing film 70 denoted by arrow P, that is, the direction of polarization of the light (polarized light) passing through polarizing film 70.

Similarly, when polarizing film 70 is disposed at an incline of about 90 degrees from the vertical direction in the horizontal direction, the direction of polarization of light passing through film 70 also becomes horizontal. In this case, as shown in FIG. 6C, light-blocking region 12 appears that runs upward and downward from the geometric center of lens 10.

When polarizing film 70 is rotated another 45 degrees, a light-blocking region appears that is right-left symmetrical with the light-blocking region 12 seen in FIG. 6B.

Figure 6:
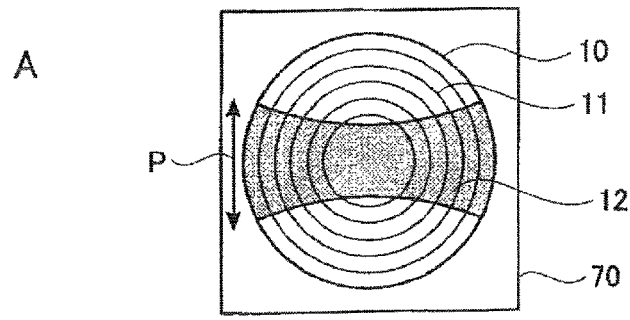
FIGS. 6A to C are plan views of regions blocking light in different directions of the polarization axes in the polarizing lens shown in FIG. 3.
Figure 6:
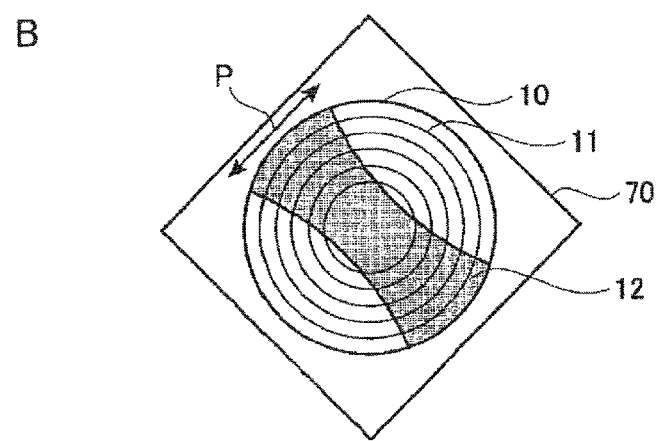
Figure 6:
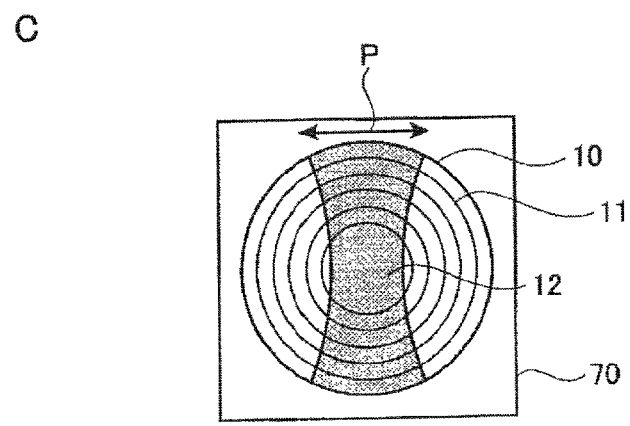

That is, it will be understood from the examples given in FIG. 6 that the polarizing lenses having the distribution of directions of polarization axes shown in FIG. 6 block both light reflecting off horizontal surfaces and vertical surfaces. They have the function of blocking reflected light having a direction of polarization in the horizontal direction by means of a region extending above and below the center of the lens. They also have the function of blocking light that reflects off vertical surfaces and arrives diagonally from the upper right and upper left by means of a region extending diagonally upward to the right and diagonally downward to the left from the center of the lens. They also have the functions of blocking light reflecting off of vertical surfaces that arrives diagonally from the upper left and diagonally from the lower right by means of a region extending from the center of the lens diagonally to the upper left and lower right, and blocking light reflecting off of vertical surfaces that arrives in a horizontal direction by means of a region extending to the right and left of the center of the lens. Since light is blocked by means of regions corresponding to the directions of incidence of polarized light entering from various angles, light reflecting off of horizontal and vertical surfaces can be efficiently blocked. When light reflected off of curved surfaces such as the lateral surfaces of automobiles is blinding, it is possible to achieve a certain light-blocking function by inclining the face either to the right or to the left to adjust the angle of eyeball revolution within lens 10 to correspond to the direction of that line of sight. In this case, light-blocking region 12 in polarizing lens 10 is configured to continuously change without abrupt change, so the burden on the eyes can be diminished.

2. Second Implementation Mode

Figure 7:
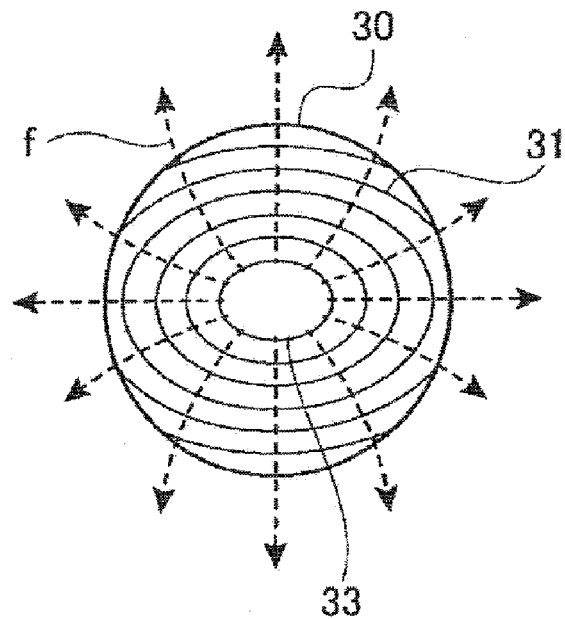
FIG. 7 is a plan view of the directions of the polarization axes of a polarizing lens relating to a second mode of carrying out the present invention.

The polarizing lens of a second implementation mode of the present invention will be described next with reference to FIG. 7. In the polarizing lens relating to the present implementation mode, the materials and methods of forming the substrate, orientation layer, polarizing layer, and other layers are identical to those in the examples described in the first implementation mode. As shown in FIG. 7, in the present implementation mode, polarization axes 31 foamed in polarizing lens 30 are elliptical in shape, and some of them are in the form of closed curves. In this case, the long axis of the ellipse is positioned in the horizontal direction of polarizing lens 30, and the short axis is positioned in the vertical direction. In this manner, the width of the light-blocking region for horizontal polarized light that runs vertically upward and downward from the geometric center of lens 30 can be made somewhat greater than that of the concentric circular distribution described in the first implementation mode.

Such a distribution in the directions of the polarization axes can be controlled by means of the distribution of the peak and valley pattern formed in the orientation layer. When the material of the polarizing layer has the property of forming polarization axes in a direction aligned with the pattern of peaks and valleys, it suffices to form rubbing traces in the orientation layer in parallel with the distribution of the desired directions of the polarization axes. When the material of the polarizing layer has the property of forming polarization axes in a direction perpendicular to the pattern of peaks and valleys, as shown by dotted line f in FIG. 7, straight lines can be rubbed in the horizontal and vertical directions of polarizing lens 30, and upwardly protruding curved paths that have a vertical axis of symmetry can be rubbed in diagonal directions to obtain the desired distribution of polarization axes 31.

In the present implementation mode, non-polarizing region 33 is desirably provided in the vicinity of the geometric center of polarizing lens 30. Non-polarizing region 33 is desirably equal to or greater than 4 mm but equal to or less than 15 mm in size for the same reasons as in the first implementation mode.

In this manner, the width of the region that blocks horizontal polarized light and extends upward and downward from the geometric center of lens 30 can be made somewhat larger than in the case of the concentric circular distribution described in the first implementation mode. Accordingly, when it is desirable to block over a broader range reflected light arriving from horizontal surfaces and light reflecting off of vertical surfaces that arrives from above and below, the distribution of the polarization axes is desirably made elliptical in this manner.

Conversely, when it is desirable to block more light reflecting off of vertical surfaces in left and right regions that arrives in horizontal directions, it suffices to position the long axis in parallel with the vertical direction and the short axis in parallel with the horizontal direction. Further, for special applications, it is also possible to position the long axis and short axis so that they intersect perpendicularly in a diagonal direction. In that case, the right eye lens and the left eye lens can be configured to be right/left symmetrical.

3. Third Implementation Mode

Figure 8:
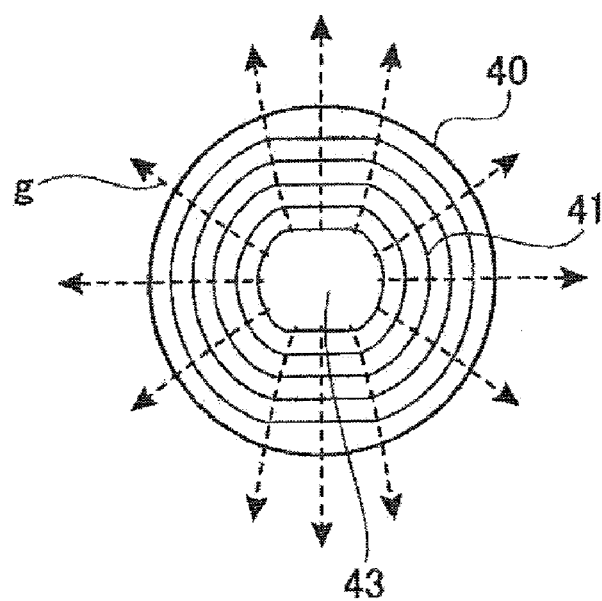
FIG. 8 is a plan view of the directions of the polarization axes of a polarizing lens relating to a third mode of carrying out the present invention.
Figure 9:
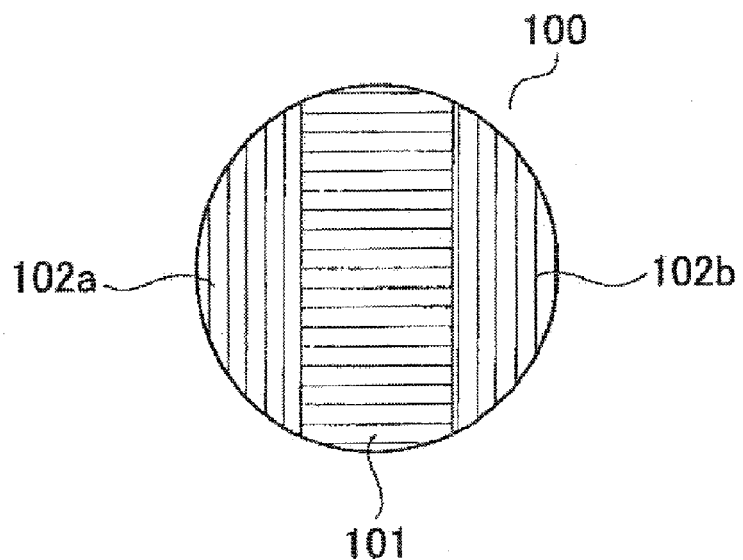
FIG. 9 is a plan view of a conventional polarizing lens.
Figure 10:
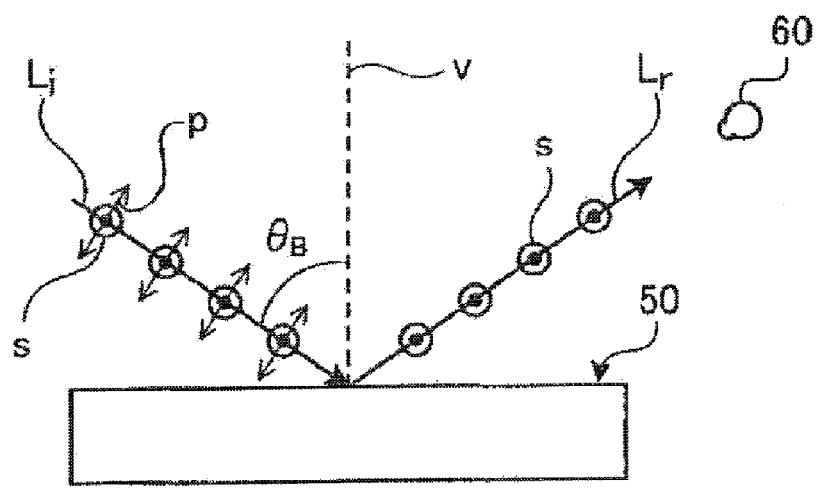
FIG. 10 is a descriptive drawing of the direction of polarization of light reflected off a horizontal surface.
Figure 11:
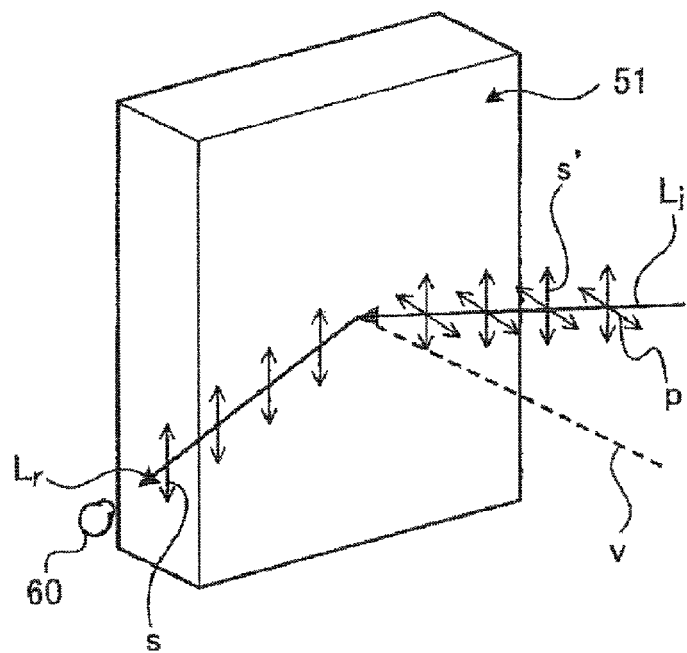
FIG. 11 is a descriptive drawing of the direction of polarization of light reflected in a horizontal direction off a vertical surface.
Figure 12:
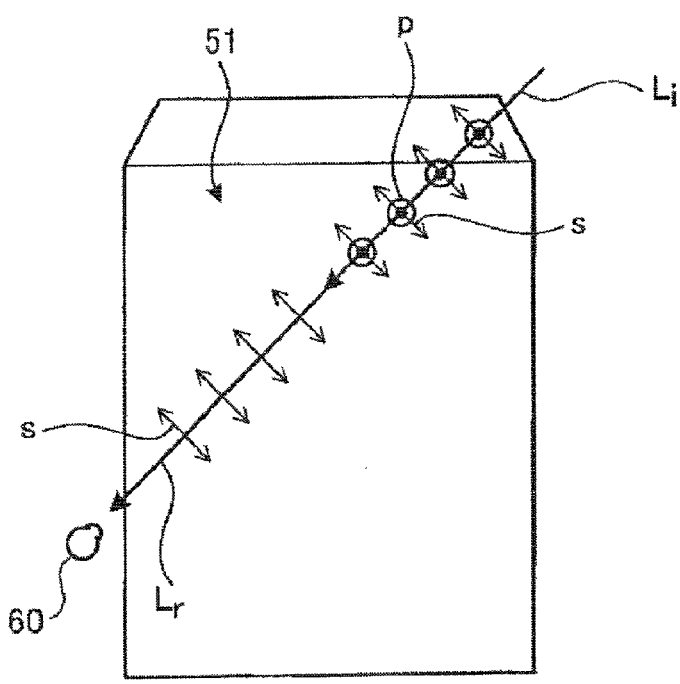
FIG. 12 is a descriptive drawing of the direction of polarization of light reflected off a vertical surface from diagonally above.
Figure 13:
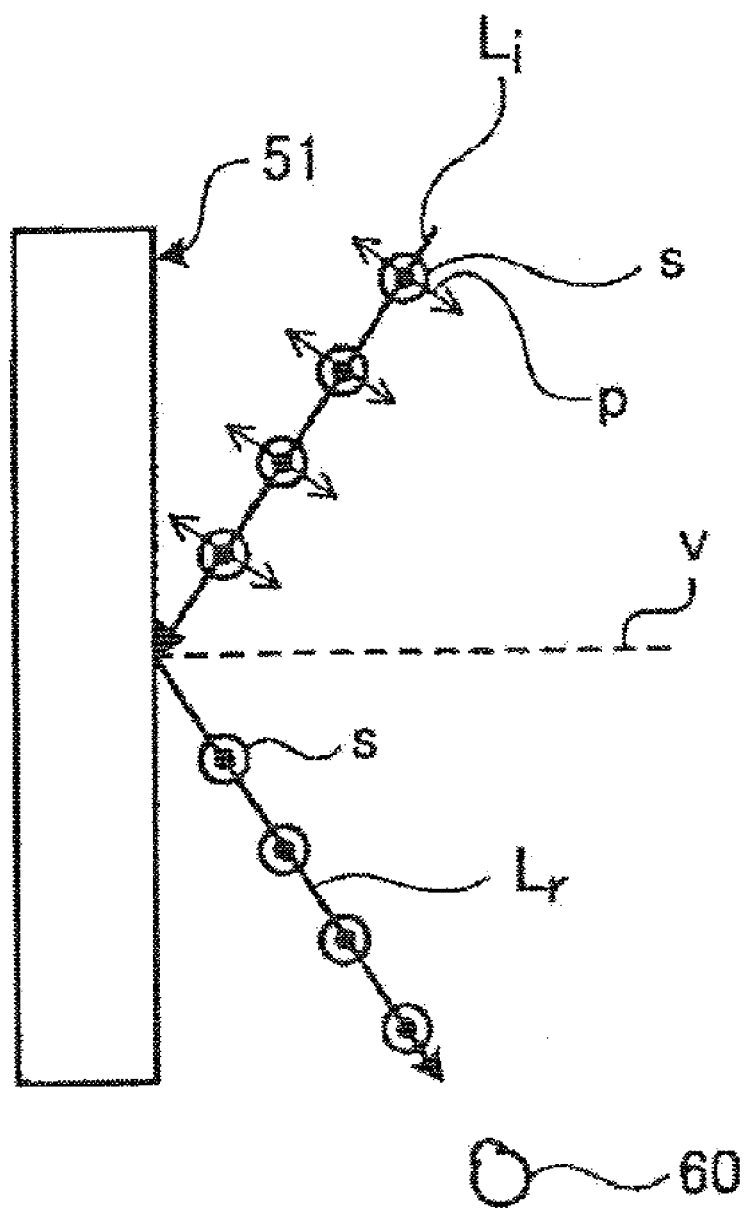
FIG. 13 is a descriptive drawing of the direction of polarization of light reflected off a vertical surface from vertically above.

The polarizing lens of a third implementation mode of the present invention will be described next with reference to FIG. 8. In the polarizing lens relating to the present implementation mode, the materials and methods of forming the substrate, orientation layer, polarizing layer, and other layers are identical to those in the examples described in the first implementation mode. In the present implementation mode, as shown in FIG. 8, the distribution of the polarization axes 41 formed in polarizing lens 40 is linear in a horizontal direction in regions above and below, and in the form of circular arcs of concentric circles in regions to the right and left, with the two being continuously connected by smooth curves.

In the present implementation mode, non-polarizing region 43 is desirably provided in the vicinity of the geometric center of polarizing lens 40. Non-polarizing region 43 is desirably equal to or greater than 4 mm but equal to or less than 15 mm in size for the same reasons as in the first implementation mode. It is preferably equal to or greater than 4 mm in length at its smallest and equal to or less than 15 mm in length at its largest.

In this case, as well, when the material of the polarizing layer has the property of forming polarization axes in a direction aligned with the pattern of peaks and valleys formed in the orientation layer, it suffices to form rubbing traces in the orientation layer in parallel with the distribution of the desired directions of the polarization axes. When the material of the polarizing layer has the property of forming polarization axes in a direction perpendicular to the pattern of peaks and valleys, as shown by dotted line g in FIG. 8, straight lines can be rubbed in the horizontal and vertical directions, radial rubbing can be conducted in regions with circular arcs of right and left concentric circles, and curved paths that protrude outward on the right and left and have a vertical axis of symmetry can be rubbed in regions with linear distributions above and below, to achieve the desired elliptical distribution of polarization axes 41.

The distribution of polarization axes 41 increases the width of the regions blocking polarized light in a horizontal direction relative to those in polarizing lens 10 in the first implementation mode in the same manner as in the second implementation mode, while the distribution of the light-blocking regions on the right and left is identical to that in the first implementation mode. In the same manner as in the second implementation mode, it is possible to rotate the distribution shown in FIG. 8 by 90 degrees to achieve a configuration in which the linear regions are on the right and left and regions of circular arcs of concentric circles are positioned above and below. A state in which the straight lines are inclined diagonally relative to the horizontal direction is also possible. In that case, as well, a distribution where the right eye lens and left eye lens are right/left symmetrical is possible.

The examples described in the second and third implementation modes both comprise regions in which the polarization axes are not closed curves. When closed curves other than concentric circles are employed in this manner, closed curves may be employed on the inner side of the lens and shapes that are not closed on the outer side of the lens. However, it is desirable for the polarizing effect to vary smoothly as the angle of eyeball revolution changes, that is, for the shape and area of the light-blocking regions to change relative to the direction of polarization of the polarized light.

It suffices to employ multiple polarization axes in the form of similarly shaped closed curves from the inner side to the outer side as shown in the first through third implementation modes to achieve a polarizing effect that does not change when the eyeball is moved from the geometric center of the lens outward, that is, is moved radially. However, this is not a limitation. For example, a distribution in which the curvature of the closed curves gradually changes so that the directions of the polarization axes gradually changes as the eyeball revolves radially from the geometric center (as the moving radius r increases in a polar coordinate representation) is also possible.

The shape of the closed curve need not be that of a circular or elliptical arc or a straight line. For example, it can be any shape in which the vertices of a polygonal shape are smoothly connected, such as a triangle. The curve of the connecting portions is desirably continuous to a degree where the second differential is a constant. However, it suffices for the change in the direction of polarization in the light-blocking region thus achieved to be of a degree that is not abrupt when viewed by the human eye.

In all of the examples, the distribution of each of the polarization axes can be a continuous curve, making it possible to achieve polarizing functions corresponding to the angle of eyeball rotation without creating an abrupt change in the light-blocking region when the eyeball is rotated.

In the polarizing lens of the present invention, in addition to a polarizing layer (also referred to as "the main polarizing layer" hereinafter) having polarization axes at least some portion of which are closed curves, a polarizing layer (additional polarizing layer) having polarization axes running in different directions from the polarization axes present in the main polarizing layer may also be incorporated. Thus, the color tone of the polarizing lens can be gradually or partly varied over the entire region of the surface or some partial region thereof, and a density distribution identical to that of a tinted lens with a gradient tint can be achieved. This point will be further described. As set forth based on FIG. 6, when a polarizing film is superposed on a polarizing layer having polarization axes that include closed-curve portions, partial light-blocking regions, that is, high-density regions can be formed. These can be utilized to permit a gradual or partial change in the density within the surface by controlling the density and direction of the polarization axes that are formed on the main polarizing layer. Thus, a density distribution can be achieved that is identical to that of a lens of continuously varying luminous transmittance (also known as "density" in tinted lenses) called a gradient tinted lens.

By contrast, by superposing polarizing films having linear polarization axes, the color tone exhibited by the polarizing lens changes when the polarization axes of the two films are parallel and when they are perpendicular, but it is impossible to gradually or partly change the density within the surface. That is, the ability to gradually or partly vary the density of the lens within the surface by providing two polarizing layers is an effect that is achieved when closed-curve polarization axes constitute at least a portion of the main polarizing layer.

A closed-curve portion in the same manner as in the main polarizing layer or an open curved portion can be incorporated into the polarization axes of the additional polarizing layer. However, in such a case, since the density cannot be gradually or partly varied when the distribution in the directions of the polarization axes is identical to that of the main polarizing layer and the two are superposed, the two layers are desirably disposed in such a manner as to not overlap. From the perspective of facilitating control of color tone, the polarization axes of the additional polarizing layer are desirably linear. When the polarization axes of the additional polarizing layer are linear, the light-blocking region can be varied by changing the direction (axial angle) of the polarization axes as described based on FIG. 6.

The additional polarizing layer can be formed on the opposite side of the substrate from the side on which the main polarizing layer is formed, or on the same side. A specific example of layered configurations comprising a main polarizing layer and an additional polarizing layer, in order from the object side to the eyeball side, are as follows: (1) substrate/main polarizing layer/additional polarizing layer; (2) substrate/additional polarizing layer/main polarizing layer; (3) additional polarizing layer/substrate/main polarizing layer; (4) main polarizing layer/substrate/additional polarizing layer; (5) additional polarizing layer/main polarizing layer/substrate, and (6) main polarizing layer/additional polarizing layer/substrate. In (1) to (6), in addition to the substrate and polarizing layers, although not listed, layers such as the above-described orientation layer, hard coat layer, primer layer, and protective layer can be provided at any position.

Further, the method of forming the main polarizing layer is as set forth above. The above-described methods used for the orientation layer are examples of methods of forming the additional polarizing layer. When the additional polarizing layer has linear, polarization axes, a commercial polarizing film or polarizing film prepared by known methods can be adhered using adhesives or the like to laminate the main polarizing layer and the additional polarizing layer. As an example of a method of manufacturing a polarizing film, a polyvinyl alcohol film can be impregnated with a dichroic dye and the film uniaxially extended to orient the dichroic dye along a single axis.

EXAMPLES

The present invention will be described in greater detail below through Examples. However, the present invention is not limited to Examples. The physical properties of the polarizing lenses obtained were evaluated as follows.

1. Evaluation Methods (1) Polarization Efficiency

The polarization efficiency (Peff) was evaluated in accordance with ISO8980-3 by obtaining the parallel transmittance (T//) and vertical transmittance (T⊥) and employing the following equation. The parallel transmittance and vertical transmittance were measured using a visible-light spectrophotometer and a polarizer.

$$\mathrm{Peff}(\%) = [(T// - T\perp)/(T// + T\perp)] \times 100$$

(2) Transparency (Haze Value)

A hazemeter HM-150 made by Murakami Color Research Laboratory Co., Ltd. was used to measure the haze value of the polarizing lenses that were produced, and the presence or absence of clouding was determined.

(Evaluation Scale)

○: No clouding (haze value≦0.4 percent)

X: Clouding present (haze value>0.4 percent)

(3) Adhesion

The adhesive performance of the polarizing lenses that were prepared was evaluated by immersing the polarizing lenses in boiling water for three hours and then subjecting them to a standard adhesive tape test under the measurement conditions given below.

(Measurement Conditions)

Crosscuts were made at intervals of 1.5 mm to form 100 squares in a cured film, adhesive tape was firmly applied to the crosscut area, and the adhesive tape was rapidly peeled off. The number of the 100 squares of the cured film that peeled off was counted. The evaluation scale was as follows.

(Evaluation Scale)

⊚ Number of squares that peeled off: 0/100 (no film peeling)

○ Number of squares that peeled off: 1 to 2/100

Δ Number of squares that peeled off: 3 to 5/100

X Number of squares that peeled off: 6 or more/100

2. Example 1

Distribution of Directions of Polarization Axes; Concentric Circular Shape Shown in FIG. 3

(1) Formation of Orientation Layer

A $SiO_2$ vapor deposition film (250 nm in thickness) was formed by electron gun vapor deposition under conditions of a lens substrate temperature of about 50° C. and a vacuum of about $10^{-5.5}$ MPa on the concave surface of a lens substrate in the form of a polyurethane urea lens (product name Phoenix, made by Hoya Corp., refractive index 1.53, hard coated, 70 mm diameter, base curve 4).

(2) Rubbing Treatment

The orientation layer obtained ($SiO_2$ vapor deposited film) was processed by a rubbing treatment with a rubbing material in the form of an abrasive-containing urethane foam (abrasive: alumina $Al_2O_3$ particles 0.1 to 5 micrometers in average particle diameter; urethane foam: roughly identical in shape to the curvature of the concave surface of the spherical lens).

The rubbing treatment was conducted for 30 s at a pressure of 50 g/cm². The rubbing material was contacted with the lens substrate while rotating the lens substrate at a rotational speed of 350 rpm in a concentric circular direction about the geometric center thereof, forming the concentric circular rubbing traces shown in FIG. 3 in the orientation layer on the lens substrate. The lens that had been treated by rubbing was washed with pure water and dried.

(3) Forming a Polarizing Layer

After drying, 2 to 3 g of a roughly 5 weight percent aqueous solution of dichroic dye was spin coated on the surface that had been subjected to the rubbing treatment to form a polarizing layer. In the spin coating, the aqueous solution of the dye was dispensed at a rotational speed of 300 rpm, which was maintained for 8 s. It was then dispensed at a rotational speed of 400 rpm, which was maintained for 45 s, and then finally dispensed at 1,000 rpm, which was maintained for 12 s. During this stage, the polarizing lens exhibited a polarization efficiency of 99 percent and a transmittance of 30.5 percent. The dichroic dye that was employed had the property of forming polarization axes along the rubbing traces. Thus, the distribution in the directions of the polarization axes in the polarizing layer that was formed was concentrically circular, as shown in FIG. 3.

Next, an aqueous solution with an iron chloride concentration of 0.15 M, a calcium hydroxide concentration of 0.2 M, and a pH of 3.5 was prepared. The lens obtained was immersed for about 30 s in this aqueous solution, after which it was removed and thoroughly washed with pure water. This step rendered the water-soluble dye highly insoluble.

(4) Forming a Protective Layer

Subsequently, the lens was immersed for 15 minutes in 10 weight percent aqueous solution of γ-aminopropyltriethoxysilane, washed three times with pure water, and heat cured for 30 minutes at 85° C. After cooling, the lens was immersed for 30 minutes in a 2 weight percent aqueous solution of γ-glycidoxypropyltrimethoxysilane in air, heat cured for 30 minutes in a 100° C. oven, and cooled following curing to form a protective layer.

(5) Forming a Functional Film

The lens on which the protective layer had been formed was polished with an abrasive (particle diameter 0.8 micrometer) and thoroughly washed. A coating of UV-curable resin was then applied by spin coating (dispensed at 500 rpm, maintained for 45 s). Following the coating, curing was conducted at a UV irradiation level of 600 mJ/cm² with a UV-irradiating apparatus to form a hard coat on the surface on which the protective layer had been formed.

3. Comparative Example

Electron gun vapor deposition under conditions of a lens substrate temperature of about 50° C. and a vacuum of about $10^{-5.5}$ MPa was conducted on a lens substrate of the same material as that employed in Example to prepare a lens substrate on which was vapor deposited an $SiO_2$ film (250 nm in thickness).

Next, the substrate that had been prepared was subjected to a rubbing treatment conducted with an abrasive ($Al_2O_3$ particles 0.8 micrometer, 1.3 micrometers, or 3 micrometers in mean particle diameter). The rubbing treatment was conducted for 30 s at a polishing pressure of 50 $g/cm^2$. The rubbing traces were formed in a linear shape in a single axial direction (a constant, fixed direction) by the rubbing.

With the exception of the above steps, a polarizing lens was obtained in the same manner as in Example 1. As set forth above, the dichroic dye employed had the property of forming polarization axes aligned with the rubbing traces. Thus, the polarization axes in the polarizing layer that was formed were linearly aligned in a single axial direction in the same manner as the rubbing traces that had been formed.

The polarization efficiency, adhesion, and transparency of the polarizing lens obtained were evaluated.

|  | Example 1 | Comp. Ex. |
|---|---|---|
| Polarization efficiency at optical center | 98% | 98% |
| 45° direction polarization efficiency in 45° upward direction | 98% | 49% |
| Transparency | ○ | ○ |
| Adhesion | ◎ | ◎ |

As set forth above, the polarizing lens of Example 1 had a polarization efficiency of equal to or greater than 98 percent for horizontal and non-horizontal incident light, which satisfied the general guidelines for polarizing lenses calling for a polarization efficiency of 50 percent. In contrast, the polarizing lens of Comparative Example having linear polarization axes was found to exhibit a 45° direction polarization efficiency of 49 percent in the region of 45° diagonally upward directions, falling short of the guidelines and presenting problems with light arriving in a diagonal direction.

Example 2

Laminated Polarizing Layers

A polarizing film on which multiple linear polarization axes were positioned in parallel was prepared as an additional polarizing film. The polarizing film that had been prepared was bonded with an adhesive to the hard coat of a polarizing lens prepared by the same method as in Example 1. When observed under natural lighting with the direction of the transmission axes of the additional polarizing layer disposed in the same directions as in FIG. 6A to 6C, the same density as in FIG. 6A to 6C was observed. Partial light-blocking regions, that is, high-density regions, were successfully formed.

Description of the numbers in the drawings are as follows:
1: Substrate; 2: Hard coat layer; 3: Adhesive layer; 4: Orientation layer; 5: Peak and valley pattern; 6: Polarizing layer; 7: Protective layer; 8: Functional film; 10, 30, 40: Polarizing lenses; 10b: Front region; 10b1: Left side region; 10b2: Right side region; 11, 31, 41: Polarization axes; 12: Polarizing region; 13, 33, 43: Non-polarizing regions; 50: Horizontal surface; 51: Vertical surface; 60, 80, 80b1, 80b2: Eyes.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A polarizing lens comprising a polarizing layer on a substrate, wherein the polarizing layer comprises polarization axes that are at least partly in the form of a closed curve, and further comprising a non-polarizing region in the vicinity of a geometric center of the lens.

2. The polarizing lens according to claim 1, which comprises polarization axes that are in the form of a closed curve and inclined relative to a horizontal direction in a left and right peripheral region away from a geometric center of the lens.

3. The polarizing lens according to claim 1, wherein directions of the polarization axes continuously change.

4. The polarizing lens according to claim 1, which comprises a region in which directions of the polarization axes are horizontal wherein the region is positioned within a region extending from a center region containing a geometric center of the lens to a vertical direction.

5. The polarizing lens according to claim 1, wherein multiple polarization axes in the form of a closed curve are disposed in concentric circles centered on a geometric center of the lens.

6. The polarizing lens according to claim 1, wherein the non-polarizing region has a diameter of equal to or greater than 4 mm but equal to or less than 15 mm.

7. The polarizing lens according to claim 1, wherein polarization axes that are in the folin of a closed curve are disposed in a region that is made a field of view by changing a direction of a line of sight by rotating an eyeball.

8. The polarizing lens according to claim 1, wherein the polarizing layer is a dye-containing layer and the lens comprises an orientation layer between the substrate and the dye-containing layer.

9. The polarizing lens according to claim 1, which comprises, in addition to the polarizing layer, an additional polarizing layer comprising polarization axes directions of which are different from those of the polarization axes of the polarizing layer.

10. The polarizing lens according to claim 9, wherein the polarization axes of the additional polarizing layer are linear.

* * * * *